United States Patent
Hough (10) Patent No.: US 6,809,869 B2
(45) Date of Patent: Oct. 26, 2004

(54) ZOOMABLE BEAMSPREADER FOR NON-IMAGING ILLUMINATION APPLICATIONS

(75) Inventor: Thomas A. Hough, Dallas, TX (US)

(73) Assignee: Genlyte Thomas Group LLC, Louisville, KY (US)

( * ) Notice: Subject to any disclaimer, the term of this patent is extended or adjusted under 35 U.S.C. 154(b) by 0 days.

(21) Appl. No.: 10/229,668

(22) Filed: Aug. 28, 2002

(65) Prior Publication Data
US 2004/0042085 A1 Mar. 4, 2004

(51) Int. Cl.[7] .......................... G02B 27/00; F21V 13/00
(52) U.S. Cl. ....................... 359/626; 359/621; 359/622; 359/619; 362/268
(58) Field of Search ................................ 359/621, 622, 359/626, 795; 362/268, 331

(56) References Cited

U.S. PATENT DOCUMENTS

| | | | |
|---|---|---|---|
| 2,076,240 A | 4/1937 | Levy | 362/281 |
| 2,650,292 A | 8/1953 | Strong | 362/268 |
| 2,950,382 A | 8/1960 | Hatch | 362/281 |
| 3,302,016 A | 1/1967 | Larraburu | 362/268 |
| 3,428,800 A | 2/1969 | Levin et al. | 362/309 |
| 3,484,599 A | 12/1969 | Little | 362/268 |
| 3,594,566 A | 7/1971 | Kneiskey | 362/268 |
| 3,665,179 A | 5/1972 | McLintic | 362/293 |
| 4,462,067 A | 7/1984 | Altman | 362/268 |
| 4,519,020 A | 5/1985 | Little | 326/268 |
| 4,602,321 A | 7/1986 | Bornhorst | 362/268 |
| 4,630,902 A | 12/1986 | Mochizuki et al. | 359/432 |
| 4,632,522 A | 12/1986 | Ishitani | 359/432 |
| 4,709,311 A | 11/1987 | Bornhorst | 362/277 |
| 4,739,456 A | 4/1988 | Little | 362/268 |
| 4,779,176 A | 10/1988 | Bornhorst | 353/62 |
| 4,867,514 A | 9/1989 | Waldron | 359/355 |
| 5,029,992 A | 7/1991 | Richardson | 359/696 |
| 5,237,367 A | 8/1993 | Kudo | 355/67 |
| 5,404,283 A | 4/1995 | Yantz et al. | 362/267 |
| 5,581,379 A | 12/1996 | Aoyama et al. | 349/5 |
| 5,598,281 A | 1/1997 | Zimmerman et al. | 349/5 |
| 5,612,821 A | 3/1997 | Schmutz | 359/622 |
| 5,684,567 A | 11/1997 | Shiozawa | 355/67 |
| 5,774,273 A | 6/1998 | Bornhorst | 359/665 |
| 5,775,799 A | 7/1998 | Forkner | 362/268 |
| 5,786,939 A | 7/1998 | Watanabe | 359/621 |
| 5,805,340 A | 9/1998 | Kelly | 359/514 |
| 5,850,310 A | 12/1998 | Schweizer | 359/622 |
| 6,059,428 A | 5/2000 | Perlo et al. | 362/268 |
| 6,115,181 A | 9/2000 | Kelly | 359/618 |
| 6,212,011 B1 | 4/2001 | Lissotschenko et al. | 359/337.1 |
| 6,246,526 B1 | 6/2001 | Okuyama | 359/621 |
| 6,282,027 B1 * | 8/2001 | Hough | 359/618 |
| 6,344,929 B1 | 2/2002 | Sugawara | 359/622 |
| 6,366,407 B2 | 4/2002 | Rivera et al. | 359/619 |

FOREIGN PATENT DOCUMENTS

| | | |
|---|---|---|
| EP | 0 757 280 A2 | 2/1997 |
| JP | 08 083743 A | 3/1996 |

* cited by examiner

Primary Examiner—David N. Spector
(74) Attorney, Agent, or Firm—Carr LLP (57) ABSTRACT

A first multiple-lens array designed with positive-power lenses produces multiple bundles of converging light rays, and a second multiple-lens array designed with negative-power lenses produces multiple bundles of collimated light rays at a certain optimal separation between the two multiple-lens arrays. As the axial separation between the two multiple-lens arrays increases, the divergence of the entire beam of light increases.

19 Claims, 10 Drawing Sheets

ZOOMABLE BEAMSPREADER FOR NON-IMAGING ILLUMINATION APPLICATIONS

FIELD OF THE INVENTION

The present invention relates to lighting instruments, and especially to devices and apparatus for controlling the distribution of light energy in non-imaging illumination applications.

DESCRIPTION OF RELATED ART

In stage lighting, it is often desirable to expand the light beam from a so-called wash luminaire to illuminate a broader area. A wash luminaire can produce such an effect using a light source and a concave reflector which are moveable with respect to a lens, such as disclosed in U.S. Pat. No. 3,428,800; or in U.S. Pat. No. 3,665,179. The divergence angle of the light beam varies depending upon the position of the source and reflector with respect to the lens. Popular variable-divergence luminaires such as the Cadenza PC manufactured by Rank Strand of the United Kingdom and the 2KW Fresnel manufactured by Mole-Richardson of California and others, use such an optical system to control the divergence angle of the light beam projected by the luminaire. A positive, or convex, front lens illuminated by a lamp and retroreflector combination produces a substantially columnar light beam and projects a relatively small pool of light when the lamp is placed at the focus of the lens. As the lamp and reflector combination is moved in either direction away from the focus of the lens, the beam diverges from columnar to project a larger pool of light. Such a system is quite large and requires many inches of travel for the lamp and reflector combination along the optical axis of the lens. The carrier mechanism of these luminaires is typically manually adjustable and the large glass front lens, typically eight to ten inches in diameter, is thick and heavy even with the significant weight reduction gained by the Fresnel design used by Mole-Richardson.

Another common system for controlling the divergence angle of a light beam is disclosed in U.S. Pat. No. 4,602,321; and uses a lamp, which is movable with respect to a parabolic reflector. When the lamp is placed at the focus of the reflector, a substantially columnar light beam emerges and projects a small pool of light. As the lamp is moved rearwardly along the optical axis of the reflector and away from the focus of the reflector, the beam diverges from columnar to form a larger pool of light. This system requires an adjustable carriage for the lamp socket and frequently requires provisions for minor (manual) adjustments along two additional axes orthogonal to the optical axis, so as to maintain proper alignment of the lamp on the optical axis, in addition to motorized adjustment along the optical axis for controlling beam divergence.

Many commonly used systems for controlling the divergence angle of a light beam use two or more lens elements is series and in combination with a fixedly mounted lamp and a fixedly mounted reflector. In these systems, one or more of the lens elements are movable with respect to the lamp and reflector to vary the divergence angle of a light beam formed thereby. Some common examples are disclosed in U.S. Pat. Nos. 2,076,240; 2,650,292; 2,950,382; 3,302,016; 3,594,556; 4,462,067; 4,519,020; 4,709,311; 4,739,456; 5,029,992; 5,404,283; among others. Some of these systems are used in image-projecting applications in which a hard-edged spot of light is projected onto a distant surface such as a stage floor or backdrop, and may also be used to project complex images formed by objects placed in a focal plane of the projection lens system, such as described, for example, in U.S. Pat. No. 4,779,176.

Another, unique system for controlling the energy distribution of a light beam in a non-imaging application is disclosed in U.S. Pat. No. 5,774,273; and uses a variable-geometry liquid-filled lens having a deformable, transparent membrane supported by a transparent, multi-cellular structure forming an array of variable-power lenslets. An optically clear liquid is pumped into or out of the structure to deform the membrane into an array of convex or concave lenslets having adjustable optical power to control energy distribution. A motorized pump is used as the actuator, and the system may be operated by remote control.

A solid-state zoomable beamspreader is disclosed in U.S. Pat. No. 6,282,027, which is incorporated herein by reference. The beamspreader comprises first and second multiple-lens arrays including a plurality of plano-convex lenses in correspondence with a plurality of plano-concave lenses having matched, curved optical surfaces. In a zero-power state, the two multiple-lens arrays are very closely spaced—possibly touching at one or more places—so that the matched convex and concave surfaces effectively cancel each other optically. But, as the two arrays are separated coaxially along the axis of a light beam, beam divergence angle increases as a function of the distance of separation. A large amount of beam divergence is obtained when the curved surfaces of the plano-concave lenses of the second array are positioned beyond the focal points of the plano-convex lenses of the first array.

The plano-convex lenses and the corresponding plano-concave lenses disclosed in U.S. Pat. No. 6,282,027 are characterized as having substantially equal but opposite optical power so that the combined optical power of the first and second multiple lens arrays is zero when the two lens arrays are separated by zero distance. Practical mechanical considerations in the design of a motor-driven apparatus for an automated lighting instrument make it desirable to prevent two glass surfaces from actually touching each other. Therefore a design methodology is required which does not require zero separation of the lens elements to achieve a zero-power state.

SUMMARY OF THE INVENTION

In accordance with the present invention, a first multiple-lens array comprises positive-power lenses and produces multiple bundles of converging light rays. A second multiple-lens array comprises negative-power lenses and produces multiple bundles of collimated light rays when the two multiple-lens arrays are axially separated. As axial separation of the two multiple-lens arrays increases, divergence of the entire beam of light increases.

DETAILED DESCRIPTION

In general, a first lens element is configured to achieve a particular distribution of light energy. The first lens element has a positive optical power and a particular focal length. A distance of separation between the first and second lens elements is chosen. A second lens element is designed to collimate light energy received from the first lens element at the distance of separation. The second lens element has a negative optical power, the value of which is different from the optical power of the first lens element. The first and second lens elements are each preferably constructed as first and second multiple-lens arrays.

Figure 1:
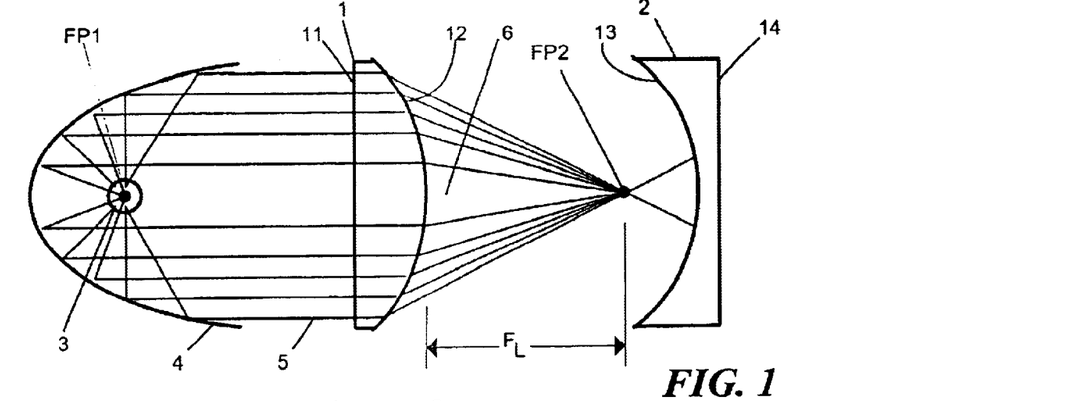
FIGS. 1 through 6 are plan views of an illumination optical system illustrating the operative concepts of the present invention.

Shown in FIG. 1 is an exemplary optical system. The system includes a first, plano-convex, lens 1 and a second, plano-concave, lens 2 mounted coaxially with a lamp 3 and a reflector 4 forming a light beam 5 having an optical axis 6. The reflector is preferably parabolic and the lamp is preferably located at or near the focus FP1 of the parabola so that the resultant light beam is substantially collimated. Practically, however, the light beam will have a small angle of divergence of perhaps four or five degrees. The light beam is incident upon the planar surface 11 of the first lens 1 and is refracted when passing through the convex surface thereof. The convex surface 12 of the first lens 1 has a positive optical power and faces towards the concave surface 13 of the second lens 2, which has a negative optical power, and the two curved surfaces have different curvatures. The first lens 1 has a focal length $F_L$ represented by focal point FP2. The shape of the curved surfaces may be spherical, but is preferably aspherical so as to modify the distribution of light through the system, thereby reducing or avoiding a "hot spot" in the center of a projected spot of light. The light beam exits the system through the planar output surface 14 of the second lens 2.

The behavior of the light beam passing through the lens system comprising the first, plano-convex, lens 1 and the second, plano-concave, lens 2, is governed by Snell's Law, in accordance with which a light ray passing from air to glass (from a less dense optical medium into a more dense optical medium) is refracted towards the surface normal while a light ray passing from glass to air (from a more dense medium to a less dense medium) is refracted away from the surface normal.

Figure 2:
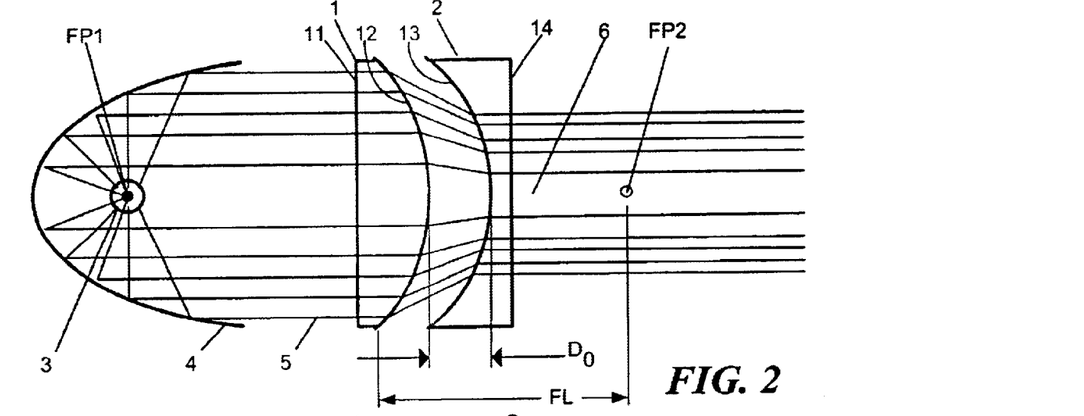

In a "zero-power" state, as shown in FIG. 2, the second lens is positioned at a certain minimum or preferred separation $D_0$. The particular distance depends upon certain mechanical considerations not necessarily related to optical design considerations. The separation $D_0$ is preferably much less than the focal length $F_L$ because, as light rays approach the focal point FP2, the light rays become somewhat disorderly, making a design solution for the curvature of the second lens impossible (as will now be explained). For each ray of light incident upon the concave surface 13 of the second lens 2, a surface normal is chosen which, in accordance with Snell's Law, yields an angle of refraction at which the light ray exits the planar output surface 14 of the second lens parallel to the optical axis 6. Practically, this design process is conducted for a selected number of light rays including an edge ray and a number of intermediate rays between the edge ray and a direct ray coincident with the optical axis. A smooth curve is then determined from this succession of surface normals and the curve is extended beyond where the edge rays are incident until the concave surface is the same diameter as the convex surface 12 of the first lens 1.

If the separation distance $D_0$ is chosen so as to place the concave surface 13 too close to focal point FP2—if $D_0$ approaches $F_L$—then the light rays incident upon the surface 13 tend to overlap, two or more rays striking the surface at the same point with different angles of incidence. This makes it impossible to choose one surface normal which will yield an angle of refraction suitable for all the light rays incident on a given point. Therefore, it is desirable to limit the optimal separation distance $D_0$ to a relatively small fraction of the focal length $F_L$.

Figure 3:
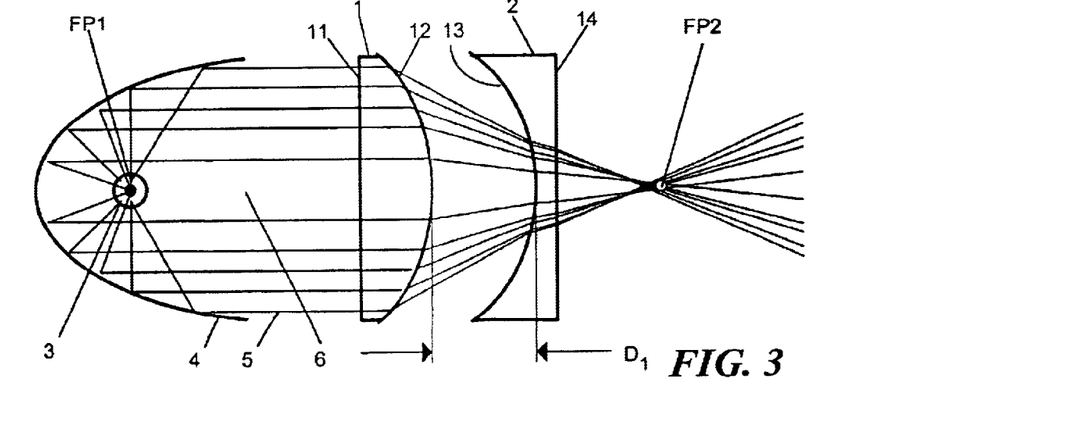

As is shown in FIG. 3, when the two lenses are separated by a larger distance $D_1$, each ray passing through the system is incident on a different part of concave surface 13 where the surface normal is different than is the case at the optimal separation distance $D_0$. Therefore, the angle of refraction for each ray is different at distance $D_1$ than at distance $D_0$ and the overall effect upon the beam of light is to increase the angle of divergence of the beam. Varying the distance separating the two lenses controls the overall angle of divergence of the beam of light, the angle of divergence being at a minimum at the preferred separation distance $D_0$.

Figure 4:
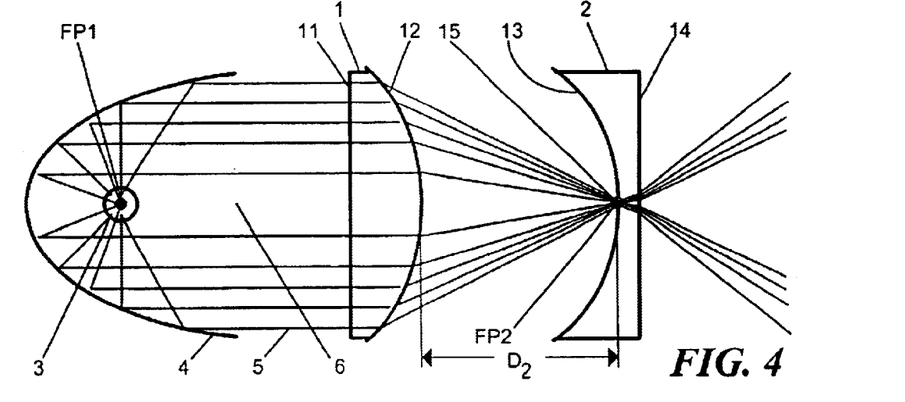
Figure 5:
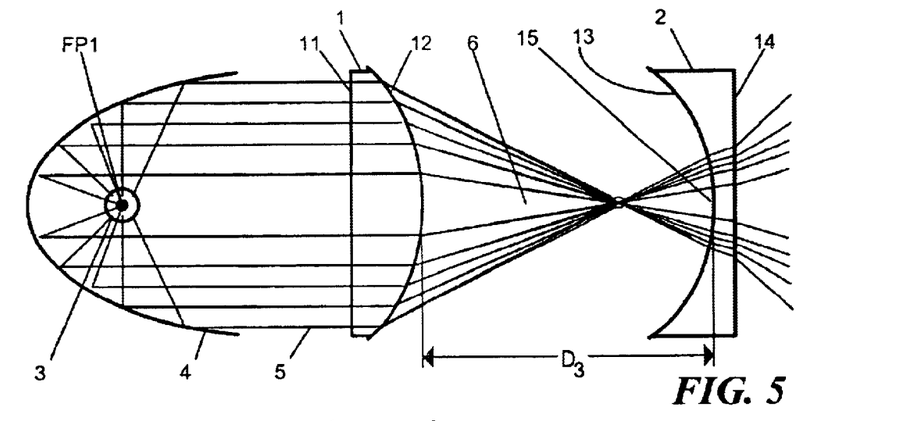

The first lens 1, having a positive optical power, tends to converge the light beam upon a focal point FP2, after which point the light beam will diverge. The second lens 2, having a negative optical power, tends to diverge a collimated light beam. When the separation distance equals the focal length of the first lens 1 ($D_2 = F_L$), the apex 15 of the concave surface 13 second lens 2 is positioned at the focal point FP2 of the first lens 1, as shown in FIG. 4. In this condition, the natural divergence of the beam of light after the focal point is amplified by the diverging effect of the second lens 2. Additional divergence is obtained at the planar output surface 14 of the second lens 2. When the apex 15 of the second lens 2 is positioned beyond the focal point FP2 of the first lens 1, as shown in FIG. 5, the diverging part of the light beam undergoes slightly less divergence through the body of the second lens 2, but diverges by a great amount as it passes through the planar output surface 14 of the second lens 2.

Figure 6:
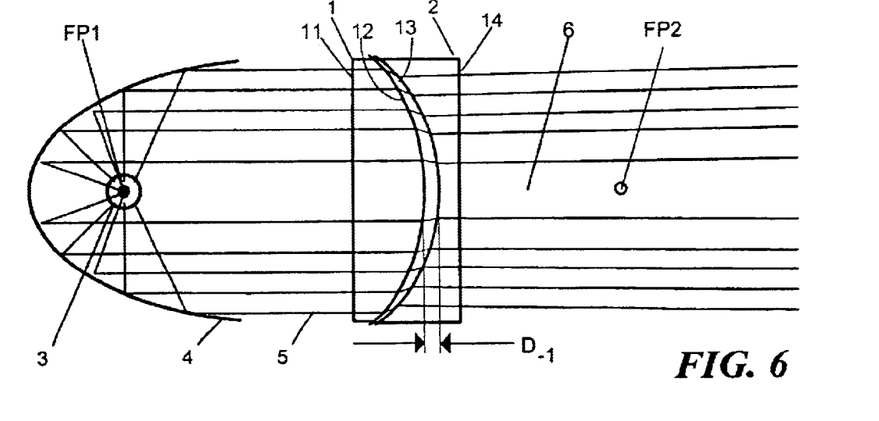

It should be noted that as the separation between the two lenses is decreased to less than the preferred separation distance $D_0$, if $D_{-1} < D_0$, as shown in FIG. 6, the angle of divergence of the light beam also increases. It is therefore apparent that the preferred separation distance $D_0$ can be found empirically, such as when calibrating the beam-spreader apparatus during assembly or following a maintenance procedure, by varying the separation distance until the minimum beam diameter is obtained. It may also be important to have some positive separation between the lens groups and an ability to move to $D_{-1}$ positions to compensate for manufacturing tolerances. Lenses may typically have several percent tolerances on their focal lengths even when molded. The ability to position the lens groups closer together than an analytically determined or expected $D_0$ allows one to null any residual divergence from the parabolic mirror (reflector 4) and lamp 3, thereby minimizing the projected beam size.

Figure 7:
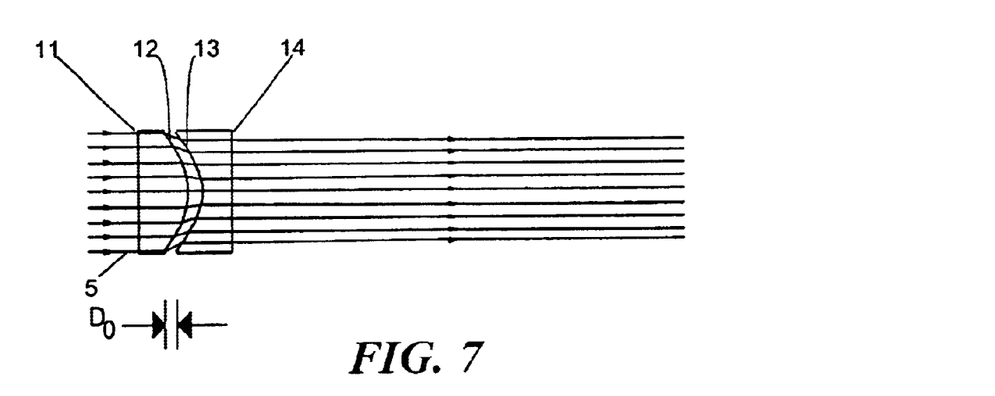
FIGS. 7 through 12 are plan views of a lens system illustrating the performance of one embodiment of the present invention.
Figure 8:
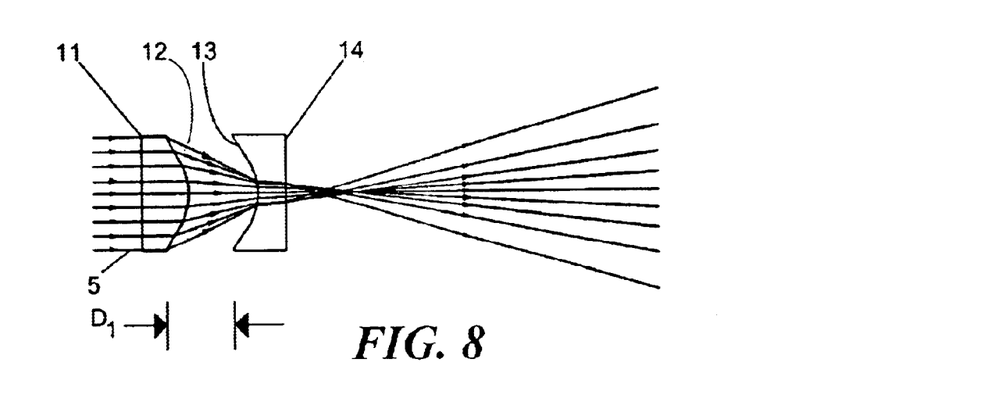
Figure 9:
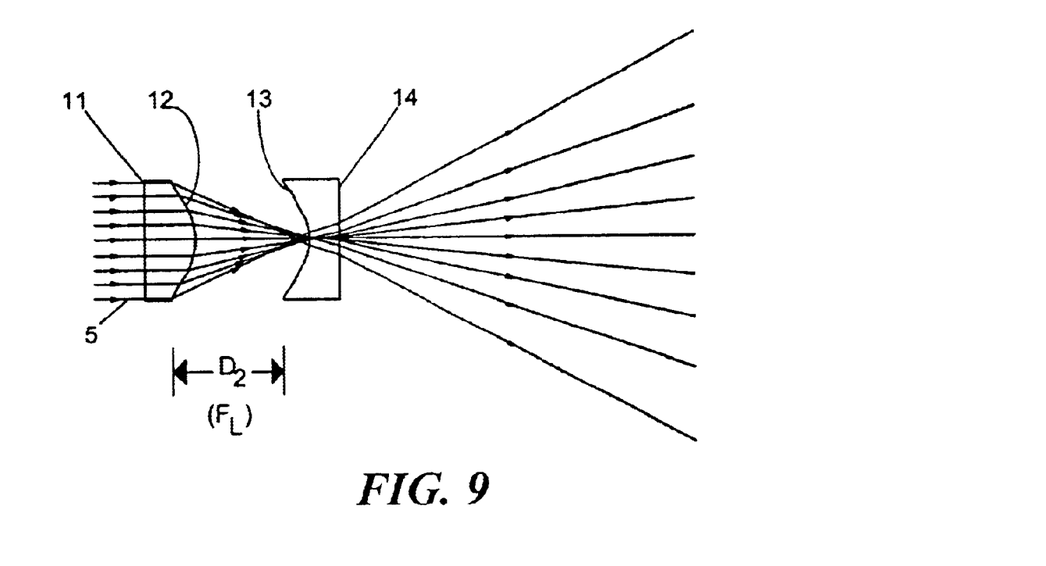
Figure 10:
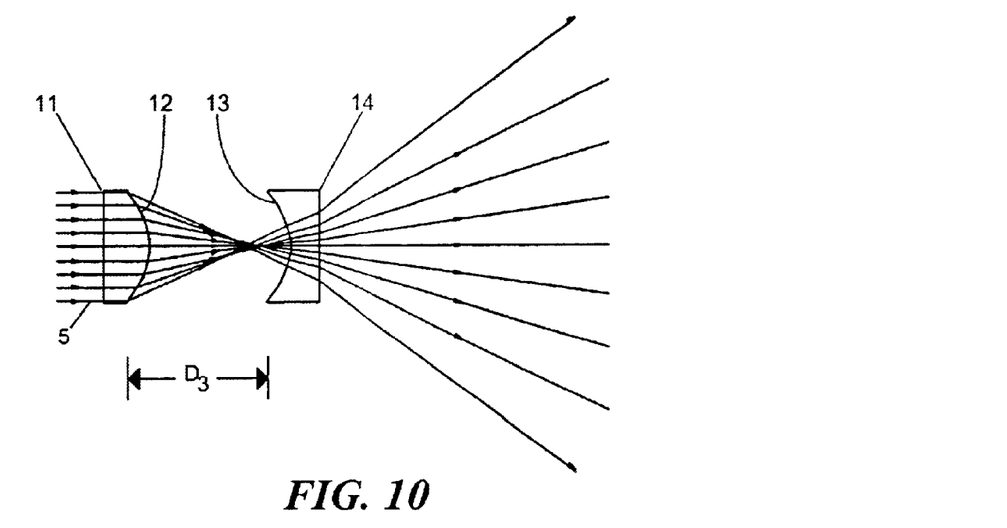
Figure 11:
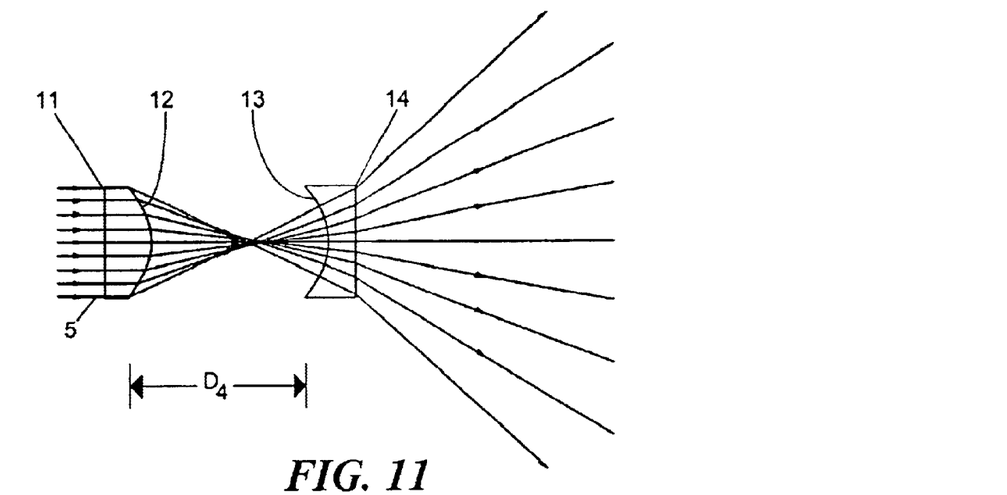
Figure 12:
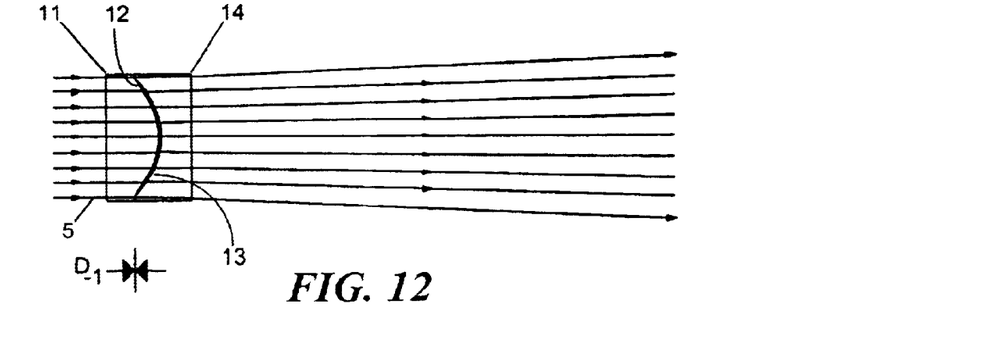

The results of computer simulation modeling the lens system according to the present invention are illustrated in FIGS. 7–12, in which the planar input surface 11, the convex surface 12, the concave surface 13, the planar output surface 14, and representative rays of the light beam 5 are shown. In this simulation, the curved surfaces are aspheric and have a diameter of approximately 12 mm. In a zero-power state, as shown in FIG. 7, the convex surface 12 and the concave surface 13 are separated by the preferred separation distance ($D_0$=1.27 mm; 0.050") and there is no appreciable effect on the angle of beam divergence. Separating the curved surfaces 12 and 13 by a greater distance ($D_1$=8.9 mm; 0.35"), as shown in FIG. 8, causes appreciable refraction of the light rays such that the beam converges somewhere along an optical axis of the system and diverges thereafter. In a practical illumination system having a significant throw length, such as in a stage lighting instrument for example, this results in a light beam of significantly enlarged diameter with respect to the zero-power state described above. Separating the curved surfaces 12, 13 even further ($D_2$=14.2 mm; 0.56"), so that the surface 13 lies at the focal point of the surface 12 as shown in FIG. 9, results in an even greater angle of beam divergence. The curved surfaces can be separated further still ($D_3$=19.3 mm; 0.76"), so that the surface 13 lies beyond the focal point of the surface 12 as shown in FIG. 10, which results in a still greater angle of beam divergence. The maximum separation of the curved surfaces ($D_4$=24.7 mm; 0.97"), as shown in FIG. 11, causes peripheral portions of the beam to pass through output surface 14 near the periphery thereof and yields the greatest possible angle of beam divergence for this particular lens system. Note that if the curved surfaces are separated by less than the optimal separation distance ($D_{-1}$=0.2 mm; 0.008") as shown in FIG. 12, appreciable refraction of the light rays occurs and the angle of beam divergence becomes significant.

Figure 13:
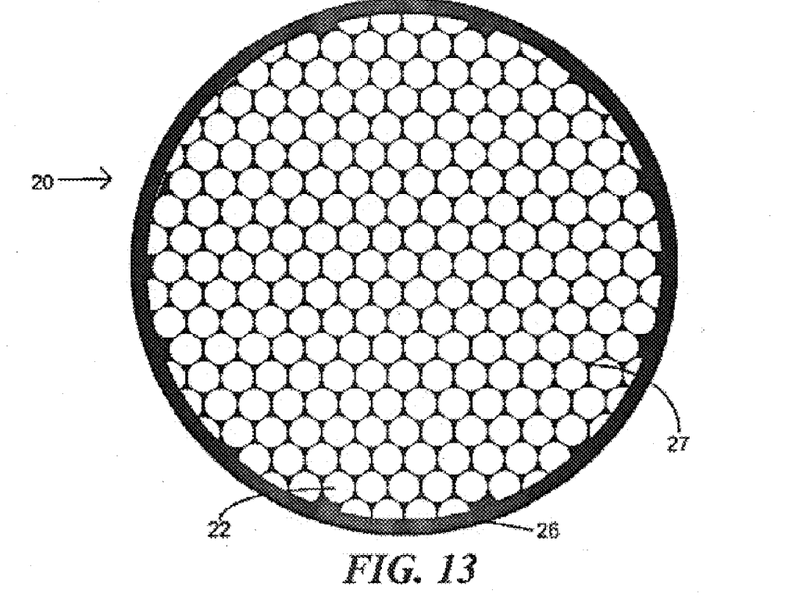
FIG. 13 is a front elevation of a lens array according to the present invention.
Figure 14:
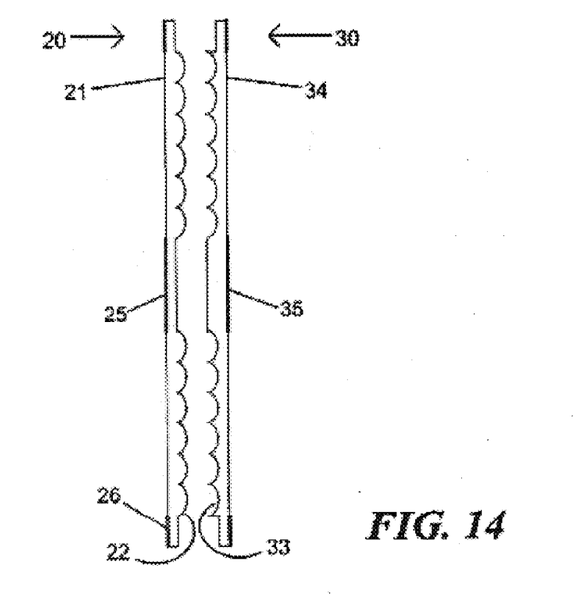
FIG. 14 is a cross-section of a lens array according to the present invention.
Figure 15:
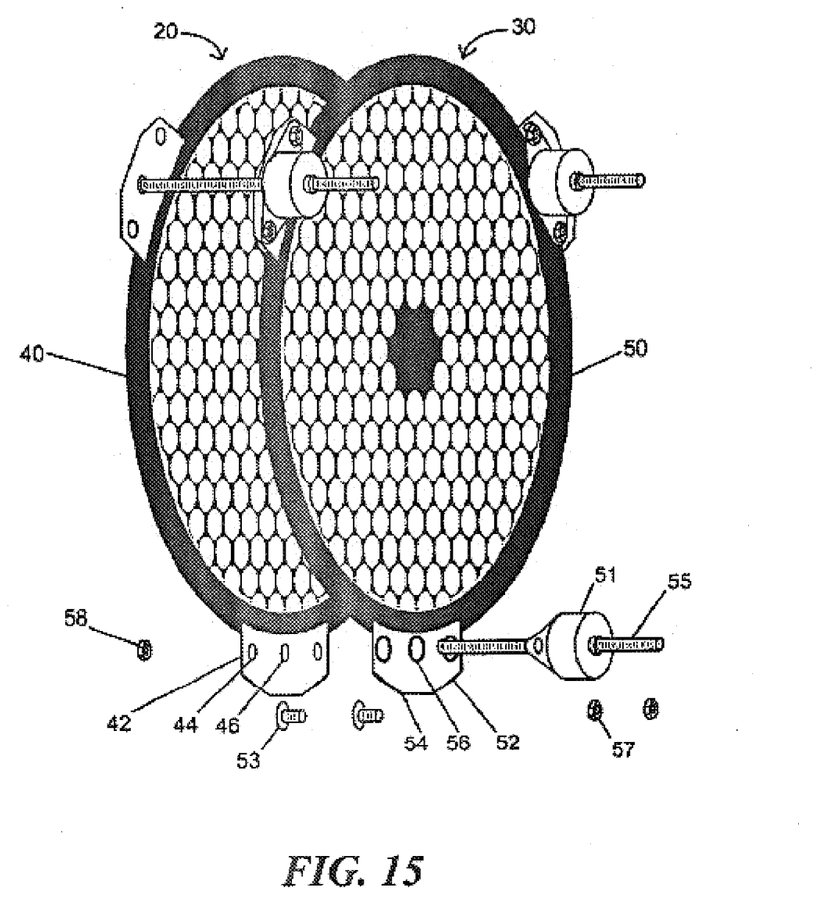
FIG. 15 is a perspective view of a lens system apparatus according to the present invention.

A preferred embodiment of the present invention, as shown in FIGS. 13–15, includes a first multiple-lens array 20 of plano-convex lenslets and a second multiple-lens array 30 of plano-concave lenslets. According to the operative principles of the invention, each positive-power, plano-convex lenslet 22 corresponds to a negative-power, plano-concave lenslet 33 such that the curved, optical-power surfaces of each of the two corresponding lenslets have different shapes. In a zero-power state, the two multiple-lens arrays are positioned at the optimal separation distance $D_0$ so that there is negligible angle of beam divergence as a light beam exits the system. As the separation between the two arrays increases, the angle of beam divergence increases. The separation between the two arrays may increase so that the array of negative-power lenslets lies beyond the focal points of the array of positive-power lenslets. The two multiple-lens arrays are held to be coaxial, and each pair of corresponding positive-power and negative-power lenslets are also held to be coaxial. The lenslets are made small in diameter compared to the diameter of a light beam passing through the array so as to reduce the mass and weight of the glass in the lens system and to reduce the length of travel—a single pair of lenses covering an eight-inch diameter beam would weigh approximately 32 pounds (14.5 kg) and travel about 16 inches (406 mm), whereas an array of small lenslets covering the same beam diameter weighs only about one pound (0.45 kg) and travels less than one inch (25.4 mm).

A practical system may be constructed such that each multiple-lens array comprises a plurality of perimetrically circular lenslets 22 (convex) or 33 (concave) in an hexagonal arrangement as shown in FIG. 13. The perimeters of the individual lenslets have circular shapes and the spaces between the lenslets in this arrangement comprise approximately 10 percent of the area of the array, through which no significant refraction takes place. Consequently, the area between the perimetrically circular lenslets is preferably masked to avoid a "hot-spot" concentration of un-diverted light rays in the center of a light beam. As another alternative, the spaces between perimetrically circular lenslets could be covered with additional, secondary, curved optical surfaces with corresponding pairs of secondary curved optical surfaces on the two multiple-lens arrays.

Figure 20:
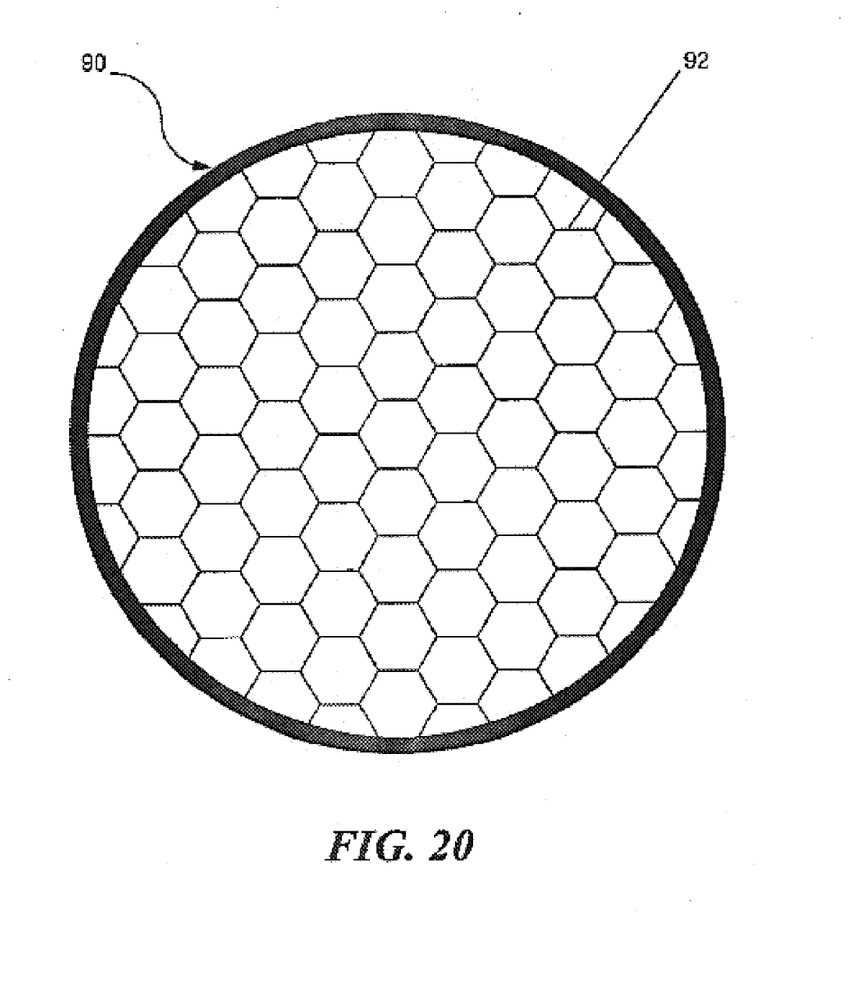
FIG. 20 is a front elevation of a lens array according to another embodiment of the present invention.

Alternatively, as shown in FIG. 20, an hexagonal array 90 of hexagonally-trimmed lenslets, or perimetrically hexagonal lenslets 92, substantially reduces or avoids a 10 percent loss of light intensity through the system by avoiding the use of a mask. In addition to reducing the loss of light intensity, the resulting beam through such a system has an hexagonal profile and projects an hexagonal spot of light. It will be apparent that the perimetrical shape of the lenslets 92 will generate a light beam of corresponding shape. Thus, a wide variety of geometric, irregular or other perimetrical shapes of the lenslets 92 could be used, if desired, to generate a variety of corresponding beam shapes. Examples include ovals, octagons, triangles, clouds, rectangles, and so on.

The preferred embodiment is economically constructed as a first and second array of perimetrically circular lenslets that are molded, in an hexagonal arrangement, on surfaces of transparent plates and mounted in suitable carriers. An opaque mask is provided for one or both arrays to fill in the spaces between the circular lenslets. As shown in FIGS. 13–15, a mask 26–27 is printed on a flat surface 21 of a transparent plate by a silk-screening process using a suitable ink that can withstand high temperatures.

Figure 21:
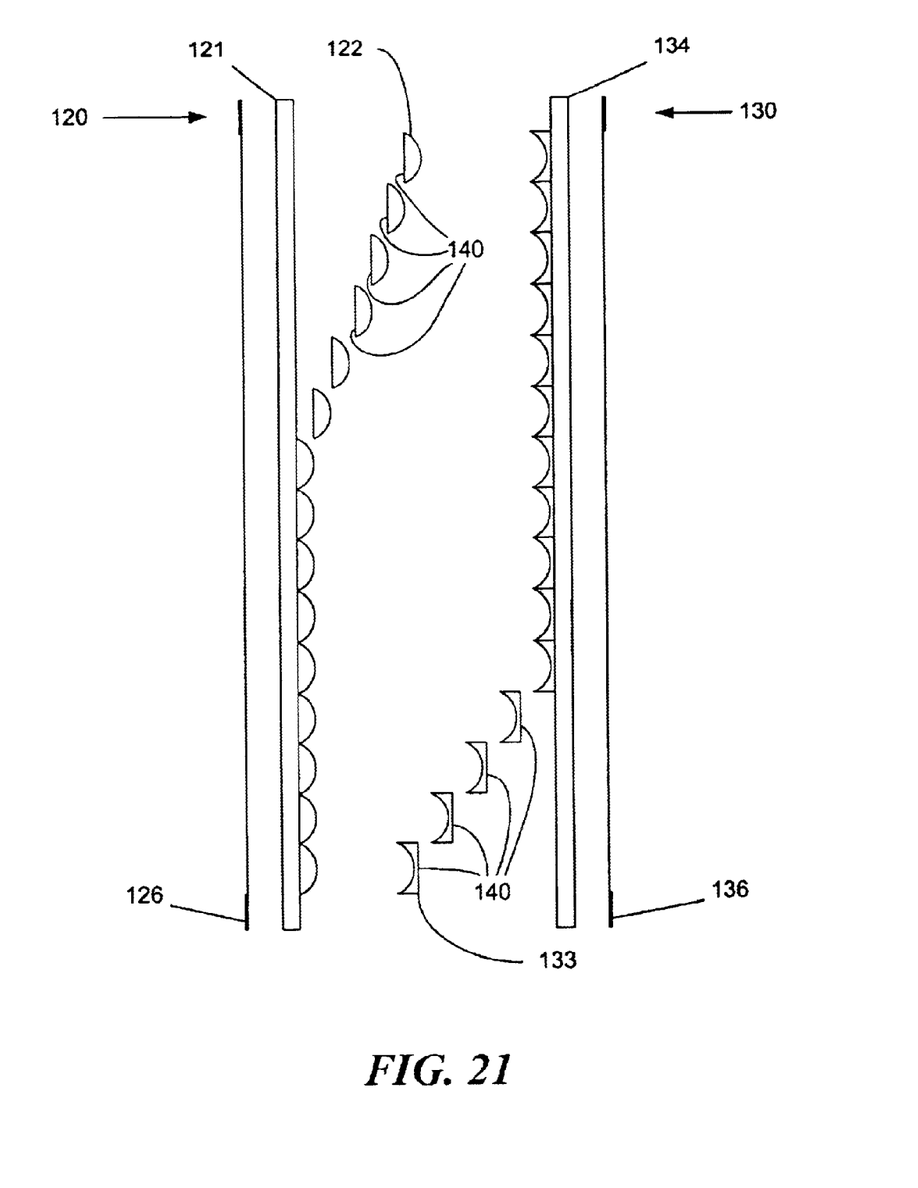
FIG. 21 is a cross-section of a lens array according to an alternate form of construction of the present invention.

Alternatively, as shown in FIG. 21, positive-power and/or negative-power lenslets 122, 133 may be separately formed and affixed to a transparent substrate 121, 134 using an optically clear cement 140 applied to the planar surfaces of lenslets 122 and/or 133. An opaque masks 126, 136, formed by a perforated plate having holes corresponding to each of the individual lenslets, blocks the transmission of light between lenslets of the associated array. It will be apparent that masks 26–27 could be printed on the transparent substrates 121 and 134 as an alternative to use of masks 126 and 136. The same method of construction can be used as well as other suitable techniques for the positive lens array and for the negative lens array.

As shown in FIG. 15, a first multiple-lens array 20 is supported within an inward-facing circumferential channel formed in a first mounting ring 40 having a plurality of flanges 42. The mounting ring may be secured to the interior of a luminaire housing by mechanical fasteners installed through mounting holes 44. A second multiple-lens array 30 is similarly supported by a second mounting ring 50, which may be identical to the first mounting ring. Linear actuators 51 are installed upon the flanges 52, secured by mechanical fasteners 53 installed through mounting holes 54 and secured with fasteners 57, with the actuator drive shaft 55 passing through a central hole 56. One end of each actuator drive shaft also passes through central holes 46 formed in the flanges 42 of the first mounting ring 40 and is secured thereto by mechanical fasteners 58. Thus is formed an electrically-operable, motorized mechanism for varying the separation between the two multiple-lens arrays 20 and 30.

The linear actuators are preferably stepper motors such as the Z20841 series motors made by Haydon Switch and Instrument, Inc. of Waterbury, Conn., which are arranged to drive a threaded drive shaft 55 through the body of the motor in response to electrical drive signals. The apparatus may be assembled with the two mounting rings in contact with each other such that the two multiple-lens arrays are properly aligned and at minimal separation for the zero-power state, and the drive shafts can then be secured to the flanges of the first mounting ring. Thereafter, the motors may be wired in series and operated by a suitable controller so that the extension of the various drive shafts remains identical through the range of operation and the multiple-lens arrays are maintained parallel to each other. Limit switches or physical stops may be employed to constrain the operation of the apparatus to within a usable range such as hereinbefore described. The apparatus is preferably remotely controlled via an electronic control system in communication with a supervisory control console such as described in U.S. Pat. No. 4,980,806. A variety of other wiring and control configurations can be used to accomplish the required positioning and control operations.

Other types of actuators can also be used, such as electric servo motors, pneumatic or hydraulic actuators, or even manually-operated actuators so long as the separation between the two multiple-lens arrays is controlled within a usable range and the multiple-lens arrays are maintained parallel to each other. The control system might also be capable of operation independently of a supervisory control console or even be free-running, if so desired, to oscillate between two extents of travel. Ideally, however, the apparatus forms part of an automated, multiple-parameter lighting instrument providing remotely-controlled azimuth and elevation adjustment and/or remotely-controlled adjustment of light beam color such as shown, for example, in U.S. Pat. No. 5,367,444.

Figure 16:
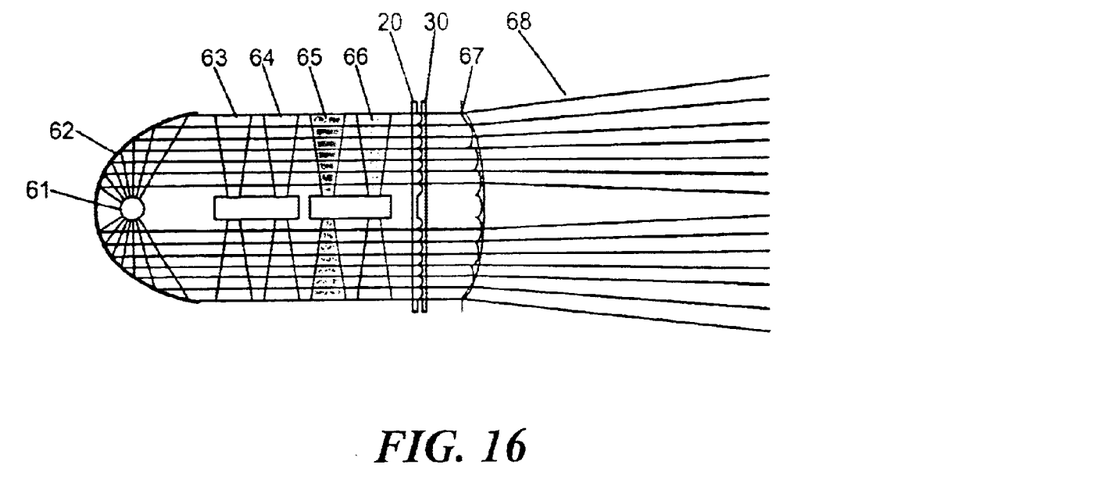
FIGS. 16 and 17 are plan views of a typical luminaire optical system including a lens system apparatus according to the present invention, and illustrating the operative concepts obtained thereby.
Figure 17:
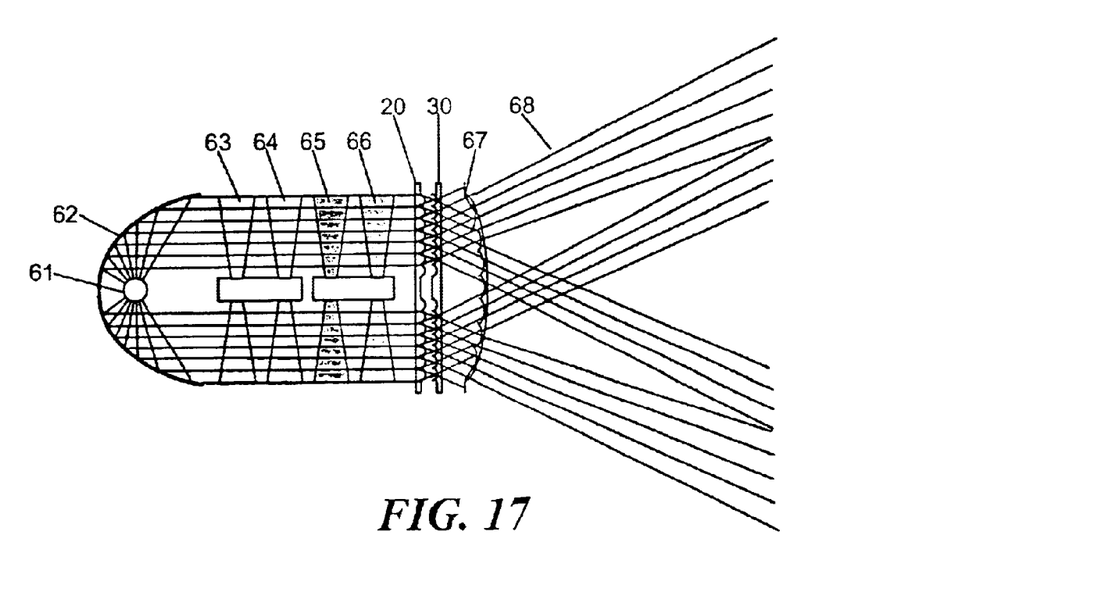

A typical optical system for a wash luminaire, used in non-imaging illumination applications, as shown in FIG. 16 and FIG. 17, includes a lamp 61 optically coupled to a parabolic reflector 62 forming a substantially columnar light beam. A series of color filters provided downstream of the lamp and reflector may include a set of cyan filters 63, a set of yellow filters 64, and a set of magenta filters 65, further including a set of dimmer vanes 66, in radial arrangement as disclosed in U.S. Pat. No. 5,073,847; or 5,186,536. A zoomable beam spreader comprising first and second multiple-lens arrays 20, 30 is provided downstream of the color filters and dimmer vanes. An output lens 67 covers the exit aperture of the luminaire, the housing of which is not shown but may comprise a ventilated structure of the type disclosed in U.S. Pat. No. 5,367,444.

The system as shown in FIG. 16 illustrates the performance of the beam spreader of the present invention in the zero-power state as multiple-lens arrays 20, 30 are positioned as closely together as possible to project a light beam 68 only a small angle of beam divergence. The system as shown in FIG. 17 illustrates the performance of the beam spreader of the present invention as the multiple-lens arrays 20, 30 are separated by some distance along the optical axis of the system so as to increase the angle of beam divergence.

The output lens 67 as shown is a well-known type of lenticular lens which shapes the beam to project a non-circular pool of light, but could just as easily be a water-clear lens imparting no appreciable beam divergence or a lightly-stippled lens imparting a small amount of diffusion to the exiting light beam 68. Interchangeable lenses of these types are widely used in the VL5™ luminaire made by Vari-Lite, Inc. of Dallas, Tex. Several different types of lenticular lens are used individually with the VL5 luminaire depending upon the desired beam shape, and the zoomable beamspreader of the present invention can be used in combination with such a lens to spread the beam in whatever shape is imparted by the lenticular exit lens.

Figure 18:
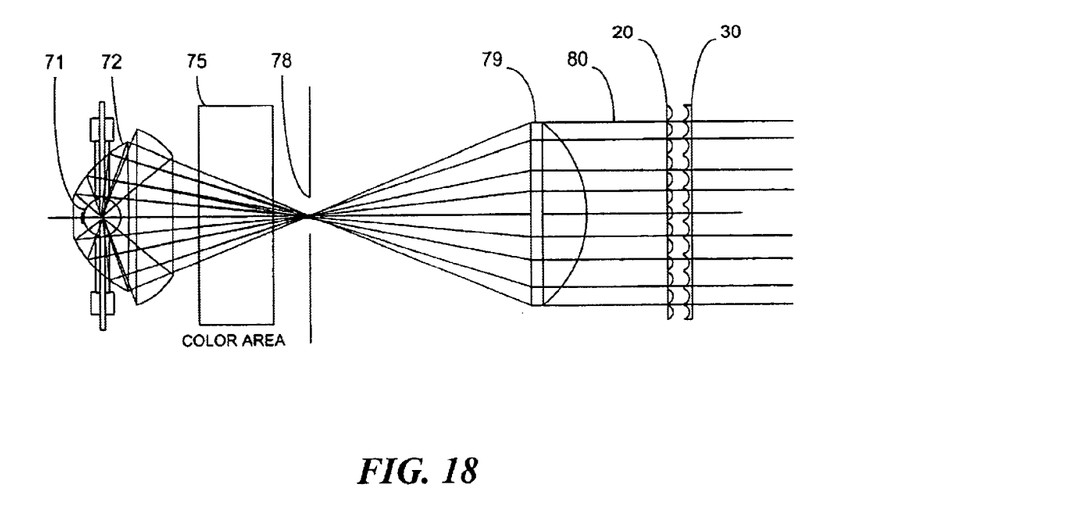
FIGS. 18 and 19 are plan views of another luminaire optical system including a lens system apparatus according to the present invention, and illustrating the operative concepts obtained thereby.
Figure 19:
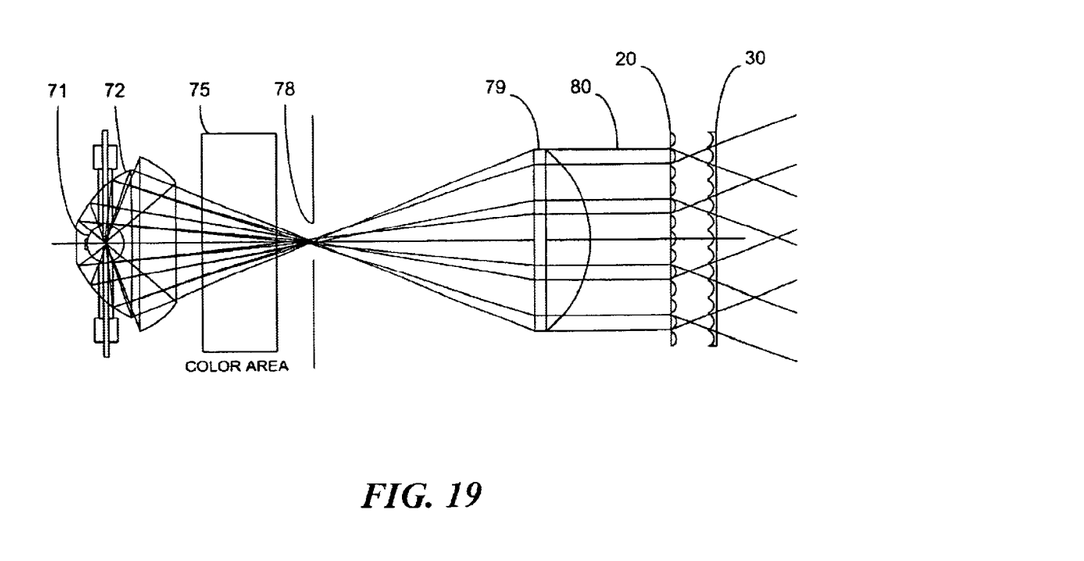

Another optical system for a luminaire used in non-imaging illumination applications, as shown in FIG. 18 and FIG. 19, includes a lamp 71 optically coupled to a reflector 72, and a collimating lens 79 forming a substantially columnar light beam. The reflector 72 may be an elliptical reflector as shown, focusing light rays to a point at which a field stop 78 is located. A color filter system 75 may be located between the reflector 72 and the field stop 78, and may comprise, for example, a set of color filter wheels as shown in British Pat. No. 629,266. A zoomable beamspreader comprising first and second multiple-lens arrays 20, 30 is provided downstream of the collimating lens 79. A suitable output lens may be provided to cover the exit aperture of the luminaire, the housing of which is not shown but may comprise any suitable structure for supporting the optical system. A typical luminaire structure is shown, for example, in U.S. Pat. No. D 366,712, or U.S. Pat. No. D 439,356.

The system as shown in FIG. 18 illustrates the performance of the beam spreader of the present invention in the zero-power state as multiple lens arrays 20, 30 are positioned at the preferred separation distance $D_0$, to project a light beam 80 having only a small, negligible angle of beam divergence. The system as shown in FIG. 19 illustrates the performance of the beam spreader of the present invention as the multiple-lens arrays 20, 30 are separated by some greater distance along the optical axis of the system so as to increase the angle of beam divergence.

I claim:

1. An apparatus for controlling divergence of a beam of light, comprising:

a first multiple-lens array comprising a plurality of positive-power lenses arranged in a pattern and supported on a transparent substrate, said plurality of positive-power lenses having a positive optical power and a focal length;

a second multiple-lens array comprising a plurality of negative-power lenses arranged in a pattern and supported on a transparent substrate, said plurality of negative-power lenses having a negative optical power different from said optical power of said positive-power lenses of said first multiple-lens array;

the first and second multiple-lens arrays being formed so that each positive-power lens surface of the first array corresponds to and is aligned with a negative-power lens surface of the second array;

the first and second multiple-lens arrays being disposed serially and coaxially in a light beam path such that positive-power lens surfaces of the first array are generally adjacent negative-power surfaces of the second array;

one of the multiple-lens arrays being movable coaxially with respect to the other of the multiple-lens arrays;

wherein the divergence of the beam of light is controlled by a variable spacing between the first and second multiple-lens arrays and wherein a combined optical power of said first and second lenses is substantially zero when said first and second multiple-lens arrays are separated at a distance greater than zero but less than the focal length of said positive-power lenses of said first multiple-lens array.

2. The apparatus of claim 1, in which no substantial transmission or no substantial refraction of the beam of light takes place in any spacing between the plurality of lenses of at least one of the first and the second multiple-lens arrays.

3. The apparatus of claim 1, wherein said positive-power lenses comprise plano-convex lenses and said negative-power lenses comprise piano-concave lenses.

4. The apparatus of claim 1, in which said positive-power lenses and said negative-power lenses are arranged in a substantially hexagonal pattern.

5. The apparatus of claim 1, in which perimeters of said positive-power lenses and said negative-power lenses are generally circular.

6. The apparatus of claim 1, in which perimeters of said positive-power lenses and said negative-power lenses have a polygonal shape.

7. The apparatus of claim 1, in which areas between said positive-power lenses and said negative-power lenses are covered with an opaque masking material.

8. The apparatus of claim 1, in which curvatures of said positive-power lenses and said negative-power lenses are spherical.

9. The apparatus of claim 1, in which curvatures of said positive-power lenses and said negative-power lenses are aspheric.

10. The apparatus of claim 1, in which the said positive-power lenses and said negative-power lenses are integrally formed in the transparent substrates.

11. The apparatus of claim 1, in which said positive-power lenses and said negative-power lenses are separately formed and are affixed to the transparent substrates.

12. An apparatus for controlling the divergence of a beam of light comprising:
- a first lens array having a central axis coaxial with the beam of light, having a first surface incident with and orthogonal to the beam of light and having a plurality of positive-power surface elements in an array opposing the first surface; and
- a second lens array having a central axis coaxial with the beam of light, having a plurality of negative-power surface elements in an array forming a surface incident with the beam of light after passing through the first lens array and having a second surface opposing the negative-power surface elements, the negative-power surface elements having a different curvature from the positive-power surface elements, the divergence of the beam of light being controlled by the spacing between the first and second lens arrays.

13. An apparatus as in claim 12 further comprising a linear actuator for moving one of the first and second lens arrays relative to the other in a direction parallel to the path of the beam of light.

14. An apparatus as in claim 12 wherein the linear actuator comprises a threaded drive shaft actuated by a servomotor.

15. An apparatus as in claim 12 wherein the convex surfaces of the first lens array are aspheric.

16. An apparatus as in claim 12 wherein the convex surfaces of the first lens array are spherical.

17. An apparatus as in claim 12 wherein the beam of light is provided by an apparatus including:
- a concave reflector; and
- a light source positioned at the focal point of the concave reflector.

18. An apparatus as in claim 17 wherein the concave reflector is a parabolic reflector.

19. A method for controlling divergence of a beam of light, comprising:
- providing a first multiple-lens array comprising a plurality of positive-power lenses arranged in a pattern and supported on a transparent substrate;
- providing a second multiple-lens array comprising a plurality of negative-power lenses arranged in a pattern and supported on a transparent substrate;
- the first and second multiple-lens arrays being formed so that each positive-power lens surface of the first array corresponds to and is aligned with a negative-power lens surface of the second array;
- the first and second multiple-lens arrays being disposed serially and coaxially in a light beam path such that positive-power lens surfaces of the first array are generally adjacent to and coaxial with negative-power surfaces of the second array;
- moving one of the multiple-lens arrays coaxially with respect to the other of the multiple-lens arrays; and
- wherein the divergence of the beam of light is controlled by a variable spacing between the first and second multiple-lens arrays and wherein a combined optical power of said first and second lenses is substantially zero when said first and second multiple-lens arrays are separated at a distance greater than zero but less than the focal length of said positive-power lenses of said first multiple-lens array.

* * * * *

UNITED STATES PATENT AND TRADEMARK OFFICE
CERTIFICATE OF CORRECTION

PATENT NO. : 6,809,869 B2
DATED : October 26, 2004
INVENTOR(S) : Thomas A. Hough It is certified that error appears in the above-identified patent and that said Letters Patent is hereby corrected as shown below:

Column 9,
Line 5, delete "piano" and insert -- plano --

Signed and Sealed this

Fifteenth Day of February, 2005

JON W. DUDAS
*Director of the United States Patent and Trademark Office*